3,814,757
DIAMINO SUBSTITUTED DICYANO PYRAZINES AND PROCESS
Dennis Scott Donald, Wilmington, Del., assignor to E. I. du Pont de Nemours and Company, Wilmington, Del.
No Drawing. Continuation-in-part of abandoned application Ser. No. 133,724, Apr. 13, 1971. This application Mar. 6, 1972, Ser. No. 232,207
Int. Cl. C07d 51/76
U.S. Cl. 260—250 R              6 Claims

ABSTRACT OF THE DISCLOSURE

Certain novel dicyano- and tricyano-pyrazines are obtained by replacing one or two cyano groups of tetracyanopyrazine. The compounds are fluorescent and can be used to prepare polymers.

RELATED APPLICATION

This application is a continuation-in-part of my copending application Ser. No. 133,724, filed Apr. 13, 1971, now abandoned.

BACKGROUND OF THE INVENTION

Field of the invention

Tetracyanopyrazine having the formula

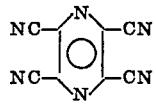

is described and claimed in coassigned patent application Ser. No. 54,617, filed July 13, 1970, now U.S. Pat. No. 3,763,161. It serves as the starting material for making the dicyano- and tricyano-pyrazines embraced in the generic formula below. The products are useful as fluorescent materials, for curing epoxy resins, and for the production of the polymers.

Description of prior art

The unique properties of per-compounds have been known for a number of years. These include the numerous fluoro compounds that have come to constitute a large field of organic chemistry. A somewhat smaller field is composed of percyano and polycyano compounds, as reviewed by T. L. Cairns and B. C. McKusick in Angewandte Chemie, 73, 520 (1961). Many of the percyano compounds exhibit the properties of undergoing nucleophilic displacement of a cyano group, a reaction that is unique to percyano compounds. An interesting example is the reaction:

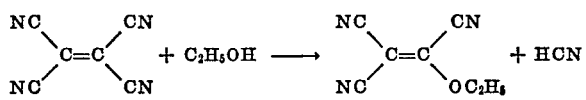

No art appears to exist, however, showing the compounds of the present invention.

DESCRIPTION OF THE INVENTION

The invention comprises compounds having the general formula below and the methods of making them. The new compounds have the formula:

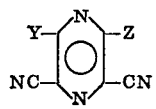

wherein (a) Y is CN and Z is selected from $-NHR^1$, $-N(R^1)_2$, $-NR^1R^2$, $-NHR^2$, $-NHNHR^1$, $-NHNHR^2$, $-N\overbrace{\qquad}NH$, $-N\overbrace{\qquad}N$; $-CH(CN)COOR^1$;

$-CH(COR^2)_2$, $-CH(NO_2)COOR^1$, $-CH_2NO_2$, $-CH(COOR^1)_2$ and salts thereof; and $-OR^3$; and (b) Y and Z, alike or different, are selected from $-OR^3$, $-NH_2$, $-NHR^1$, $-N(R^1)_2$, $-NR^1R^2$, $-N\overbrace{\qquad}NH$ and $-N\overbrace{\qquad}O$;

and wherein each $R^1$, alike or different, is alkyl or alkenyl of up to 4 carbon atoms; $R^2$ is aryl, aralkyl or alkaryl of 6 to 10 carbons atoms; and $R^3$ is primary or secondary alkyl or alkenyl of up to 4 carbon atoms or aralkyl of up to 10 carbon atoms.

The new compounds can be made by reacting tetracyanopyrazine with appropriate reagents. For example the reaction to replace one cyano group of the starting material involves the reaction of tetracyanopyrazine with an essentially equimolar amount of a compounud of the formula ZH, where Z has the values given above under (a) and with the proviso that Z may also equal —OH. The specific compound where Y is CN and Z is OH is the subject of another copending application of assignee. The reaction proceeds smoothly and in high yield and may be shown as:

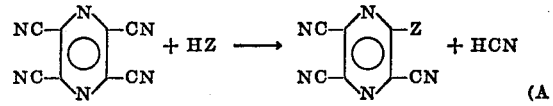

(A)

The optimum reaction conditions vary rather widely depending on the specific nucleophilic reagent employed. Thus. the temperature of reaction ranges from —60° C, for the highly reactive primary and secondary amines to reflux temperatures for the alkanols, e.g., from about 25° C. to 150° C. Aromatic amines and carbanions react readily at —60° C. to 50° C., and preferably at 0 to 5° C.

Reaction times similarly range widely from instantaneous for alkyl amines to several hours at reflux for the higher alcohols. For example, the methanol reaction is complete in 30 minutes at 25° C. while 20 hours is required for 2-butanol. The rapid amine reactions are best controlled by slow addition of the amine at low temperatures. Generally, reactions are complete in 0.5 to 24 hours and preferably are planned to be complete in 1–5 hours.

The more nucleophilic compounds such as ammonia and primary and secondary amines present a special case and, when present in excess, displace more than one cyano group as in equation B:

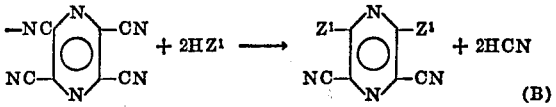

(B)

wherein $Z^1$ is $-NH_2$, $-NHR^1$, $-N(R^1)_2$, $-N\overbrace{\qquad}NH$, $-N\overbrace{\qquad}O$, or $-OR^3$ with $R^1$ having the values set out above and $HZ^1$ is used in at least two molar equivalents.

In the replacement of a single cyano group, care must be exercised to avoid the presence of unreacted amine during workup of the reaction mixture.

The reaction of ammonia and primary amines can be conveniently monitored by following color changes during the addition of the amine. The addition is preferably slow and the reaction generates a deep red color that fades as the displacement occurs. Addition of amine in excess of one equivalent produces a permanent coloration. The color change is much like that of an acid-base indicator in acidimetric measurement.

Aryl amines show much greater reactivity in reaction A than alcohols but they have not yet been found to undergo reaction B. Reaction A proceeds readily at −60° C. to 25° C. and preferably at 0 to 5° C.

Alcohols have shown considerably lower reactivity in replacing a cyano group of tetracyanopyrazine and the reactions are generally run at 25–150° C., and preferably at 60–100° C. The reactivity of alcohols is strongly affected by steric considerations. Thus, primary alcohols are most active, followed by secondary alcohols.

The reactivity of alcohols can be greatly enhanced by the addition of a basic catalyst such as a trialkylamine. This modification is of particular value when it is desired to displace two cyano groups as in reaction B.

As previously noted, an excess of alkylamine is to be avoided in reaction A, and preferably exactly one mole of reagent per mole of tetracyanopyrazine is used. Aromatic amines and alcohols are generally used in proportions equimolar with, or in excess of, the tetracyanopyrazine. This will usually result in employment of 1–5 molar, and preferably 1–1.2 molar, equivalents of aromatic amine or alcohol per mole of tetracyanopyrazine.

Reaction B, which is limited to ammonia, primary and secondary aliphatic amines, and base-catalyzed alcohols, requires at least two moles of reactant per mole of tetracyanopyrazine, and generally 2–6 moles per mole of tetracyanopyrazine are employed. Preferably, 3–4 moles are used in this reaction.

Certain carbanions can also replace a cyano group of tetracyanopyrazine as shown in Example 12 in which the triethylammonium salt of 2 - nitromethyl-3,5,6-tricyanopyrazine is prepared. Analogous active methylene compounds such as malonic esters, $CH_2(COOR^1)_2$; cyanoacetic esters, $CH_2(CN)COOR^1$; 1,3-diketones, $CH_2(COR^2)_2$, e.g., dibenzoylmethane; nitroacetic esters, $CH_2(NO_2)COOR^1$; and analogs react similarly with tetracyanopyrazine. The radicals $R^1$ and $R^2$ have the values previously set forth.

Pressure is not a critical factor in the practice of this invention and, while the reactions are generally carried out at ambient pressure, they may also be carried out at pressures considerably below atmospheric, e.g., at about 10 mm. when employing gaseous reagents. Similarly, the reactions may be carried out at pressures above atmospheric, e.g., at pressures as high as several hundred atmospheres.

Suitable solvents include tetrahydrofuran, acetone, dioxane, acetonitrile, ethyl acetate and other lower esters such as glycol dimethyl ether (glyme) and glycol diethyl ether.

SPECIFIC EMBODIMENTS OF THE INVENTION

The following examples illustrate specific embodiments of the invention. All parts are by weight unless otherwise stated.

EXAMPLE 1

2,6-diamino-3,5-dicyanopyrazine

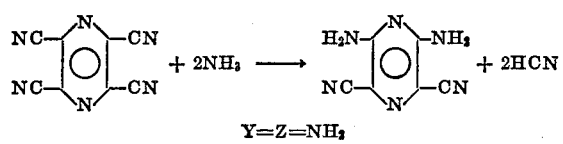

$Y=Z=NH_2$

To a stirred pool of ca. 25 ml. of liquid ammonia under nitrogen was added dropwise over a period of 0.5 hour a solution of 10.0 g. (0.0556 mole) of tetracyanopyrazine in 75 ml. of dry tetrahydrofuran. The solution turned deep red with the first drop. After the addition was complete, the deeply colored solution was stirred under a stream of nitrogen, filtered and washed with fresh tetrahydrofuran. This slightly grey material (4.42 g.) is relatively pure 2,6-diamino-3,5-dicyanopyrazine. Evaporation of the filtrate yielded 4.52 g. of darker product which is only slightly less pure product.

Recrystallization from dimethylformamide yielded long, slightly yellow needles containing solvent of crystallization which was removed by heating at 100° C. or higher at 20 mm. Hg for several hours. This material began to darken to a red solid above 300° C. and did not melt below 400° C.

IR (KBr): 2.89μ, 2.97μ, 3.07μ, 3.14μ, 5.98μ, 6.10μ (—NH₂); 4.48μ (—C≡N); 6.48μ (conjugated C=C and/or C=N).

UV $\lambda_{max}^{EtOH}$: 354 mμ (ε 16,500), 274 mμ (ε 16,700), 222 mμ (ε 33,600).

HRMS: molecular ion, measured m/e 160.0494; calcd. m/e 160.0497.

Analysis.—Calcd. for $C_6H_4N_6$: C, 45.00; H, 2.52; N, 52.48. Found: C, 45.29; H, 2.79; N, 52.46.

EXAMPLE 2

2,6-diamino-3,5-dicyanopyrazine

A stream of dry ammonia was passed over a rapidly stirred solution of 20.0 g. (0.111 mol) of tetracyanopyrazine in 475 ml. of tetrahydrofuran for 0.75 hour. A deep red color was generated which faded as the ammonia was consumed. When the color persited, the reaction was complete. The exothermic reaction was maintained below 25° C. by ice-bath cooling during the initial part of the addition. The reaction mixture was evaporated to dryness on a rotatory evaporator giving, after drying at 100° C. in a vacuum oven, 18.1 g. of grey powder which was relatively pure 2,6-diamino-3,5-dicyanopyrazine.

In addition to the procedures set out in Examples 1 and 2, 2,6-diamino-3,5-dicyanopyrazine can also be prepared by ammonia displacement of the 6-cyano group in 2-amino-3,5,6-tricyanopyrazine as set out in Examples 3 and 4 below. The 2-amino-3,5,6-tricyanopyrazine compound and its synthesis is disclosed in commonly assigned patent application Ser. No. 54,617, filed in the name of Donald R. Hartter on July 13, 1970.

EXAMPLE 3

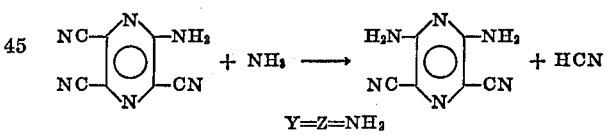

$Y=Z=NH_2$

To a magnetically stirred pool of liquid ammonia cooled in an acetone/Dry Ice bath was added dropwise over a period of 1.3 hours a solution of 2.0 g. of aminotricyanopyrazine in 100 ml. of dry tetrahydrofuan. The deep red solution was stirred for an additional hour at −70° C., warmed to room temperature and taken to dryness on a rotary evaporator to leave 1.97 g. of a pale yellow solid whose infrared spectrum indicated virtually pure 2,6-diamino-3,5-dicyanopyrazine. A water wash removed the small amount of impurities present and the material can be purified further by crystallization.

EXAMPLE 4

2,6-diamino-3,5-dicyanopyrazine

A 1-liter, 3-necked, round-bottom flask equipped with an addition funnel, thermometer, magnetic stirring bar and gas inlet tube was charged with 100 ml. of dry tetrahydrofuran and cooled to 2° C. in an ice bath. After passing dry ammonia over the rapidly stirred solvent for 5 minutes, the dropwise addition of 40.0 g. of aminotricyanopyrazine in 400 ml. of dry tetrahydrofuran was begun at such a rate that the temperature did not rise above 8° C. Ammonia was passed over the solution continuously during the addition and was continued for 1 hour at 5° C. after the addition was complete. The cold slurry was poured into 800 ml. of ice water giving a dark suspension which was filtered with vacuum. The filter-cake was washed with distilled water until the washes were clear and almost colorless. The washing was continued with acetone until the washes were only slightly yellow, about 350 ml. being required. The infrared spectrum of the pale grey solid was identical with that of pure 2,6-diamino-3,5-dicyanopyrazine. After drying overnight at 100° C. at ca. 30 mm. Hg, 31.0 g. (82.2%) of material was obtained. Some additional material can be recovered from the water/tetrahydrofuran solutions by evaporation of the tetrahydrofuran and isolation of the precipitated product as described above.

EXAMPLE 5

2,6-bis(dimethylamino)-3,5-dicyanopyrazine

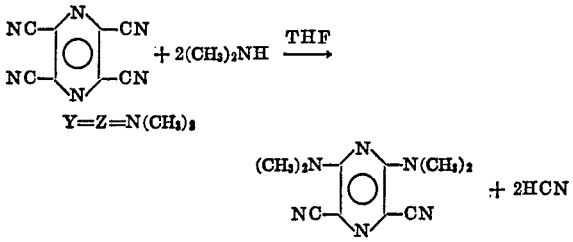

A 250-ml. 3-necked, round-bottomed flask equipped with a magnetic stirring bar, thermometer, gas inlet tube and gas outlet was charged with 50 ml. of anhydrous tetrahydrofuran. Gaseous dimethylamine was passed into the reaction vessel until the volume of the tetrahydrofuran solution had increased by several milliliters. The gas inlet tube was replaced with an addition funnel containing 5.0 g. (0.0278 mol) of tetracyanopyrazine in 25 ml. of tetrahydrofuran. A 20° C. rise in temperature accompanied the initial addition of the solution and an ice bath was applied to maintain the temperature at about 15° C. during the remainder of the addition. A yellow precipitate began to form after 1 ml. of the tetracyanopyrazine-tetrahydrofuran solution had been added. After the addition was complete, the slurry was stirred for an additional 15 minutes and was filtered. The pale yellow solid obtained was washed once with cold tetrahydrofuran and air-dried giving 4.87 g. of material melting at 213.0-214.0° C. and showing only one spot on a thin layer chromatogram (Silica Gel G) using acetone, chloroform, benzene and acetonitrile. Evaporation of the filtrate yielded 0.92 g. of only slightly less pure material. Recrystallization of 2.0 g. of the purer material from 20 ml. of chloroform gave 1.05 g. of 2,6-bis(dimethylamino)-3,5-dicyanopyrazine as shiny yellow plates, M.P. 214.0-215.0° C. Crude yield, 96.5%.

IR (KBr): 3.38μ, 3.42μ (sh) (saturated —CH); 4.51μ (—C≡N); 6.36μ (sh), 6.44μ (conjugated cyclic C=C and C=N).

UV $\lambda_{max}^{EtOH}$: 373 mμ (ε 14,300); 293 mμ (ε 20,000); 253 mμ (ε 31,400).

Analysis.—Calcd. for $C_{10}H_{12}N_6$: C, 55.54; H, 5.59; N, 38.87. Found: C, 55.03; H, 5.68; N, 39.21.

EXAMPLE 6

2-(N-methyl-N-phenylamino)-3,5,6-tricyanopyrazine

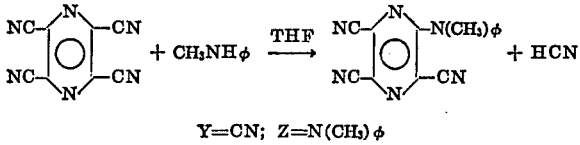

To a vigorously stirred solution of 20 ml. of N-methylaniline in 30 ml. of anhydrous tetrahydrofuran was added dropwise a solution of 5.0 g. (2.78 mmol) of tetracyanopyrazine in 40 ml. of anhydrous tetrahydrofuran at such a rate that the temperature did not rise above 26° C. The addition required 1.5 hours and the reaction was complete at this time. The reaction mixture was poured into 500 ml. of water and a small amount of diethyl ether was added to extract the excess N-methylaniline leaving yellow crystals which were collected by filtration and washed with small portions of diethyl ether giving 4.90 g. of 2 - (N-methyl-N-phenyiamino)-3,5,6-tricyanopyrazine, M.P. 175–177° C. Recrystallization of 4.0 g. of this material from 30 ml. of chloroform gave 3.3 g. of pure product as lustrous orange plates, M.P. 175–177° C. Large, deep red crystals of this material form upon slow crystallization from acetone or acetonitrile.

IR (KBr): 3.25μ (=CH); 3.40μ (saturated —CH); 4.45μ (—C≡); 6.22μ, 6.38μ (sh); 6.43μ, 6.58μ and 6.68μ (aromatic C=C, conjugated cyclic C=C and C=N); 12.80μ, 12.85μ, 12.92μ, 14.15μ, 14.30μ (monosubstituted aromatic).

UV $\lambda_{max}^{EtOH}$: 360 mμ (sh) (ε 7,250), 307 mμ (ε 16,300), 240 mμ (ε 10,400).

NMR: (acetone-$d_6$) singlet, 7.51δ (5H); singlet, 3.61δ (3H).

Analysis.—Calcd. for $C_{14}H_8N_6$: C, 64.60; H, 3.08; N, 32.30. Found: C, 64.00, 64.09; H, 2.78, 2.99; N, 32.53, 32.61.

EXAMPLE 7

2-methoxy-3,5,6-tricyanopyrazine

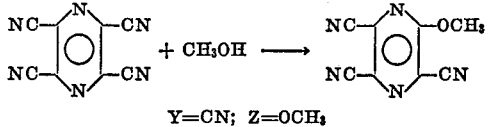

A solution of 5.0 g. of tetracyanopyrazine in 50 ml. of absolute methanol was allowed to stand under nitrogen at room temperature. The reaction was complete within 2 hours. Further reaction did not occur after 20 hours at room temperature or even after 20 hours at reflux. The solvent was stripped off on a rotatory evaporator leaving a slightly yellow oil which crystallized upon scratching with a glass rod. This material melts at 90.0–91.0° C. Material recrystallized from diethyl ether/petroleum ether melts at 93.5–94.5° C.

IR (KBr): 3.37μ (C—H); 4.43μ (—C≡N); 6.41μ, 6.71μ (conjugated C=C and/or C=N); 8.12μ (=CO—C).

UV $\lambda_{max}^{EtOH}$: 323 mμ (13,500); 259 mμ (ε 14,300).

HRMS: molecular ion, measured m/e, 185.0346; calculated m/e, 185.0338.

NMR (CDCl$_3$): singlet, 4.37δ.

Analysis.—Calcd. for $C_8H_3N_5O$: C, 51.89; H, 1.62; N, 37.77. Found: C, 51.44; H, 1.60; N, 38.15.

EXAMPLE 8

2-anilino-3,5,6-tricyanopyrazine

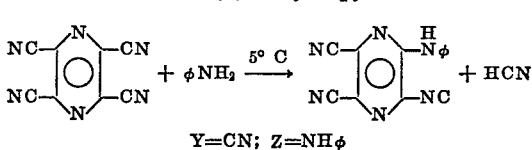

To an ice bath-cooled-solution of 6.0 ml. (65.6 mmol) of aniline in 40 ml. of anhydrous tetrahydrofuran was added dropwise with stirring a solution of 10.0 g. (55.6 mmol) of tetracyanopyrazine in 40 ml. of anhydrous tetrahydrofuran at such a rate that the temperature did not rise above 5° C. After stirring for an additional 15 minutes, the reaction mixture was poured into 300 ml. of ice water. Crystallization of the precipitated oil was induced by scratching to produce an orange solid which was collected by filtration and washed with water. After air-drying overnight, the material was dried in a vacuum oven at 100° C. for 2 hours giving 13.45 g. (54.7 mmol, 98.2%) of material whose infrared spectrum is identical with recrystallized material. Recrystallization of 13.0 g. of the crude product from 80 ml. of acetonitrile gave 11.3 g. of orange crystals of 2 - anilino - 3,5,6 - tricyanopyrazine, M.P. 234° C. (decomp.).

IR (KBr): 2.96μ (—NH); 3.26μ (=CH); 4.44μ (—C≡N); 6.20μ, 6.37μ, 6.48μ, 6.66μ (conjugated, cyclic C=C and C=N; may include —NH); 12.98μ, 14.42μ, 14.58μ (monosubstituted aromatic).

UV $\lambda_{max.}^{EtOH}$: 400 mμ (ε 3,420); 318 mμ (ε 18,900); 235 mμ (ε 10,900).

NMR (acetone-$d_6$): broad absorption centered at 2.82δ (1H), complex pattern centered at 7.5δ (5H) typical of N-substituted anilines.

Analysis.—Calcd. for $C_{13}H_6N_6$: C, 63.40; H, 2.42; N, 34.10. Found: C, 63.34, 63.66, 63.26; H, 2.13, 2.13, 2.42; N, 34.73, 34.68.

EXAMPLE 9

2-allylamino-3,5,6-tricyanopyrazine

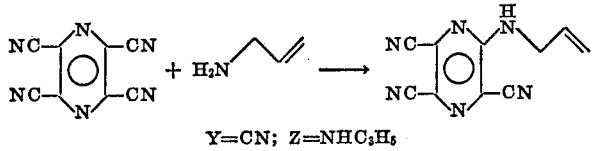

Y=CN; Z=NHC$_3$H$_5$

To a solution of 5.0 g. (0.0278 mole) of tetracyanopyrazine in 50 ml. of anhydrous tetrahydrofuran at —50° C. was added dropwise with stirring over a period of 15 minutes a solution of 2.0 g. (0.0350 mole) of allylamine in 10 ml. of anhydrous tetrahydrofuran. A transient, deep red color which persists near the end of the addition is produced by each new drop of the allylamine solution. After the addition was complete, the deep red solution was poured into 500 ml. of water. The dark solid which formed was collected by filtration, redissolved in acetone and the resulting solution was decolorized with Darco. Removal of the solvent gave 3.6 g. of yellow solid. Recrystallization of 2.4 g. of this material from benzene gave 2.11 g. of 2-allylamino-3,5,6-tricyanopyrazine as yellow needles, M.P. 128–130° C.

IR (KBr): 3.00μ (—NH); 4.48μ (—C≡N); 6.08μ (vinyl C=C), 6.30μ, 6.52μ (conjugated cyclic C=C and/or C=N); 10.05μ, 10.53μ and 10.62μ (vinyl CH=CH$_2$).

UV $\lambda_{max.}^{EtOH}$: 393 mμ (ε=4770); 296 mμ (ε=24,200); 230 mμ (sh) (ε=10,100).

NMR (acetone-$d_6$) multiplet, 4.25δ (2H); multiplet, 5.25δ (2H); multiplet, 5.9δ (1H).

Analysis.—Calcd. for $C_{10}R_6N_6$: C, 57.14; H, 2.88; N, 39.99. Found: C, 56.76, 56.76; H, 2.88, 2.68; N, 40.03, 39.68.

EXAMPLE 10

2-(2-butoxy)-3,5,6-tricyanopyrazine

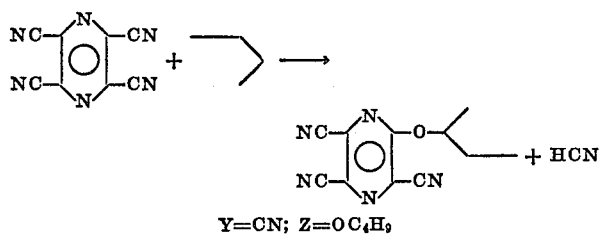

Y=CN; Z=OC$_4$H$_9$

A slurry of 5.0 g. (0.0278 mole) of tetracyanopyrazine in 100 ml. of 2-butanol was stirred at ambient temperature for 22 hours during which time complete solution occurred. The slightly yellow solution was diluted with petroleum ether and cooled in an ice bath to form 2.94 g. of white plates which were collected by filtration; M.P. 75.0 to 76.0° C. Recrystallization from diethylether/petroleum ether gave material melting 76.5–77.0° C. The original mother liquors were evaporated to dryness under vacuum yielding 1.92 g. of material which was separated into 1.79 g. of the title compound as a diethylether soluble fraction and 130 mg. of diethylether insoluble material whose infrared spectrum suggests an iminoester. Total yield of 2-(2-butoxy)-3,5,6-tricyanopyrazine was 4.73 g., 75%.

IR (Nujol): 4.43μ (weak); 6.42μ, 6.55μ, 7.50μ, 8.13μ.

UV $\lambda_{max.}^{EtOH}$: 325 mμ (ε=13,000); 260 (ε=15,100).

NMR (acetone-$d_6$) triplet, J=7.0 Hz., 1.0δ (3H); doublet, J=6.0 Hz., 1.45δ (3H); complex multiplet, 1.8δ (2H); sextet, J=6 Hz., 5.42δ (1H).

Analysis.—Calcd. for $C_{11}H_9N_5O$: C, 58.14; H, 3.99; N, 30.82. Found: C, 58.51; H, 4.15; N, 30.81.

In addition to the alcohols shown in Examples 7 and 10, other primary and secondary alcohols which may be used in the reaction to displace one or two cyano groups of tetracyanopyrazine, include for example, ethanol, 1-propanol, 2 - propanol, 1 - butanol, 2 - butanol, benzyl alcohol, β-phenethyl alcohol, 3-phenylpropanol, 4-phenylbutanol, etc.

EXAMPLE 11

2-benzylamino-3,5,6-tricyanopyrazine

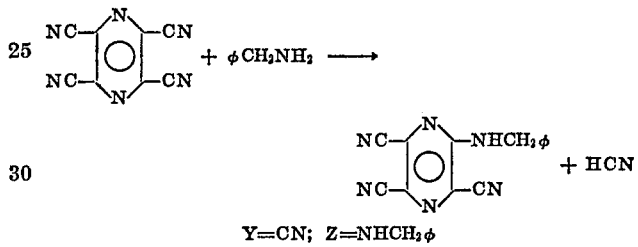

Y=CN; Z=NHCH$_2$φ

To a solution of 5.00 g. (2.78×10$^{-2}$ mole) of tetracyanopyrazine in 50 ml. of dry tetrahydrofuran at ca. —65° C. was added dropwise with stirring a solution of 3.00 g. (2.80×10$^{-2}$ mole) of benzylamine in 10 ml. of dry tetrahydrofuran. A transient deep red color was produced as each drop contacted the cold solution. When the addition was complete, the clear, orange solution was allowed to warm slowly to room temperature and was then evaporated to dryness yielding 7.01 g. of a yellow solid melting at 180–182° C. Crystallization from nitromethane gave large yellow crystals of 2-benzylamino-3,5, 6-tricyanopyrazine, M.P. 183.0–184.0° C. with decomposition.

IR (Nujol). 3.0μ, 4.45μ, 6.23μ, 6.50μ, 7.90μ, 7.95μ, 13.18μ, 14.22μ.

UV $\lambda_{max.}^{EtOH}$: 393 mμ (ε=4,340); 297 mμ (ε=24,900); 230 mμ (sh) (ε=9,850).

NMR (acetone-$d_6$) singlet, 4.8δ (2H); multiplet, 7.31δ (5H); broad absorption, 8.67δ (1H).

Analysis.—Calcd. for $C_{14}H_8N_6$: C, 64.61; H, 3.10; N, 32.29. Found: C, 64.45, 64.07; H, 2.90, 3.10; N, 32.94, 32.42.

EXAMPLE 12

Triethylammonium salt of 2-nitromethyl-3,5,6-tricyanopyrazine

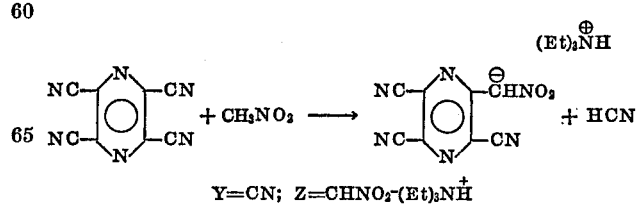

Y=CN; Z=CHNO$_2^-$(Et)$_3$N$\overset{+}{H}$

A solution of 5.00 g. (0.0278 mole) of tetracyanopyrazine in 50 ml. of dry tetrahydrofuran was cooled to 0° C. and 2.00 g. (0.0328 mole) of nitromethane was added in one portion. To the stirred solution was added dropwise 3.30 g. (0.0328 mole) of triethylamine at such a rate that the temperature did not rise above 5° C. The dark solution was evaporated to dryness leaving the trimethylammonium 2,4,5 - tricyanopyrazinyl nitromethanide as a relatively pure, dark red solid, M.P. 119.0–120.0° C. (decomposition).

IR (KBr): 3.27µ, 3.57µ, 3.65µ, 3.98µ (related to (Et₃ṄH)⊕), 4.49µ (—C≡N); 6.47µ, 7.66µ (—NO₂); 6.65µ (C=C and/or C=N).

UV $\lambda_{max}^{EtOH}$: 423 mµ (ε=45,300), 254 mµ (ε=11,200).

NMR (acetone-d₆) triplet, 1.41δ (3H); quartet, 3.43δ (2H); broad singlet, 6.40δ (1H); singlet, 7.15δ (1H).

*Analysis.*—Calcd. for $C_{14}H_{17}N_7O_2$: C, 53.33; H, 5.40; N, 31.11. Found: C, 51.91, 52.28; H, 4.90, 5.02; N, 31.58, 31.79.

EXAMPLE 13

2,6-di(allylamino)-3,5-dicyanopyrazine

Y=Z=—NHCH₂CH=CH₂

A solution of 3.5 g. (61.4 mmol) of allylamine in 100 ml. of dry tetrahydrofuran was added over a 40-minute period to a stirred solution of 5.0 g. (27.8 mmol) of tetracyanopyrazine in 15 ml. of tetrahydrofuran. Initially each drop of amine solution generated a deep red color and the temperature rose to 43° C. This temperature prevailed throughout the addition. Considerable darkening occurred toward the end of the reaction. Stirring was continued for 30 minutes after the addition was completed followed by evaporation of the reaction mixture to dryness. The solid residue was redissolved in tetrahydrofuran, treated with Darco®, filtered and evaporated to dryness. The yellow solid product (6.5 g.) was crystallized from methylene chloride to give 0.76 g. of 2,6-di(allylamino)-3,5-dicyanopyrazine, melting at 218° C. (sealed tube under nitrogen).

IR (KBr): 2.98µ (NH); multiplet 3.25–3.40µ (=CH and —CH); 4.51µ (—C≡N—); 6.06µ (vinyl); 6.24, 6.45, 6.50µ (conjugated C=C and/or C≡N); 9.97, 10.20, 10.69, 10.88µ (vinyl).

UV: $\lambda_{max}^{EtOH}$ nm. (ε=18,000); 288 nm. (ε=21,600); 238 nm. (ε=31,000).

HRMS: molecular ion observed m/e=240.116, calcd. 240.123.

NMR: (dimethylsulfoxide, multiplet 3.70–4.20δ (2H, allyl); multiplet 4.88–5.35δ (2H, terminal olefin); complex 5.50–6.30δ (1H, allyl); multiplet 7.90–8.30δ (2H, NH).

*Analysis.*—Calcd. for $C_{12}H_{12}N_6$: C, 60.00; H, 5.00; N, 35.00. Found: C, 59.41; H, 5.10; N, 35.27.

EXAMPLE 14

2,6-bis(N-methylamino)-3,5-dicyanopyrazine
Y=Z=NHCH₃

A slow stream of monomethylamine was passed over a rapidly stirred solution of 5.00 g. (2.78×10⁻² mol) of tetracyanopyrazine in 45 ml. of dry tetrahydrofuran for 1 hour. A yellow precipitate formed which was collected by filtration, washed with cold tetrahydrofuran and air-dried giving 910 mg. of nearly pure 2,6-bis(N-methylamino)-3,5-dicyanopyrazine. Recrystallization from di-methylacetamide gave the analytically pure material which does not melt below 350° C.

IR (KBr): 2.96µ (—NH); 3.37µ (saturated C—H); 4.49µ (—C≡N); 6.19µ and 6.24µ (conjugated C=C and/or —C≡N); 7.06µ (probably —NCH₃).

UV $\lambda_{max}^{EtOH}$: 370 mµ (ε=16,900); 363 mµ (ε=17,700) 288 mµ (ε=19,200); 235 mµ (ε=31,000).

HRMS: molecular ion, $C_8H_8N_6$, measured m/e, 188.0812; calcd. m/e, 188.0810; observed m/e, 83 and 68 for M-(90+CH₃) and M-(90+CH₃NH), respectively. These fragments evidence the cleavage:

*Analysis.*—Calcd. for $C_8H_8N_6$: C, 51.05; H, 4.28; N, 44.66. Found: C, 51.05; H, 4.47; N, 44.34.

EXAMPLE 15

2,6-dimethoxy-3,5-dicyanopyrazine
Y=Z=OCH₃

Three grams of the tetracyanopyrazine-N,N-dimethylaniline charge-transfer complex in 20 ml. of methanol was refluxed under N₂ for 8 hours; the blue color gradually faded. Upon cooling overnight large pale brown plates formed. These were collected and recrystallized from methanol to give 1.17 g. (87%) light tan crystals of 2,6-dimethoxy-3,5-dicyanopyrazine, M.P. 158.1 to 159.8° C.

*Analysis.*—Calcd. for $C_8H_6N_4O_2$: C, 50.53; H, 3.18; N, 29.47. Found: C, 50.37; H, 3.20; N, 29.70.

IR (KBr): 3.36µ (aliphatic CH), 4.47µ (nitrile), and 8.29µ (ether).

UV $\lambda_{max}^{EtOH}$: 257 mµ (k 79.4; ε=15,100), 322 mµ (k 84.7, ε=16,000).

NMR (CDCl₃, TMSi): 4.23δ (singlet, OCH₃).

Mass spectrum molecular ion calcd. for $C_8H_6N_4O_2$: m/e 190.0490. Found: m/e 190.0491.

EXAMPLE 16

2-(N-methylamino)-3,5,6-tricyanopyrazine

Y=CN
Z=NHCH₃

A stream of anhydrous methylamine was passed over a vigorously stirred solution of 5.00 g. (2.78×10⁻² mol) of tetracyanopyrazine in 50 ml. of anhydrous tetrahydrofuran cooled to 0° in an ice/salt bath. A deep red color was generated at the vortex which was initially dissipated into the solution. When the red color persisted the reaction was immediately quenched by pouring the reaction mixture into 400 ml. of water. A yellow solid formed which was collected by filtration, washed with water and air dried giving 4.97 g. (97%) of 2-(N-methyl-amino)-3,5,6-tricyanopyrazine whose infrared spectrum is virtually identical with the infrared spectrum of analytically pure material obtained by crystallization from benzene, M.P. 168.0–169.0° C.

IR (KBr): 3.00μ (—NH); 3.38μ (saturated —CH); 4.48μ and 4.51μ (—C≡N); 6.22μ, 6.42μ, 6.50μ and 6.64μ (conjugated cyclic C=C and C=N, may include —NH).

UV $\lambda_{max.}^{EtOH}$: 395 mμ (ε=4420); 295 mμ (21,500); 232 mμ (ε=9,100).

NMR (acetone-d$_6$): singlet, 3.13δ (3H); very broad peak centered at 8.3δ (1H).

HRMS: molecular ion, calculated for C$_8$H$_4$N$_6$, m/e 184.0497; measured m/e, 184.0479.

Analysis.—Calcd. for C$_8$H$_4$N$_6$: C, 52.17; H, 2.19; N, 45.64. Found: C, 51.91; H, 2.05; N, 46.05.

EXAMPLE 17

2-dimethylamino-3,5,6-tricyanopyrazine

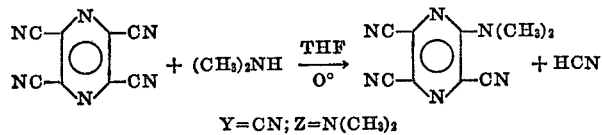

Y=CN; Z=N(CH$_3$)$_2$

To a well-stirred solution of 5.00 g. (27.8 mmole) of tetracyanopyrazine in 50 ml. of dry tetrahydrofuran at 0° C. was added over a period of 1 hour by volatilization from a cold trap, 2.50 ml. of anhydrous dimethylamine. An acetone/Dry Ice condenser was used to contain the dimethylamine in the reaction vessel until it was absorbed and consumed. After an additional hour the reaction mixture was poured into 250 ml. of ice water and the yellow solid which formed was collected by filtration and washed with water. After drying there was 5.10 g. (92.7% crude yield) of material whose infrared spectrum is identical with that of analytically pure material recrystallized from 5:1 carbon tetrachloride/chloroform, M.P. 100–101°.

IR (KBr): 3.40μ, 3.48μ, 4.48μ, 6.54μ, 6.72μ.

UV $\lambda_{max.}^{CH_3CN}$: 410 mμ (ε=4180); 310 mμ (ε=24,200); 242 mμ (ε=11,400).

NMR (acetone-d$_6$): singlet, 3.55δ.

Analysis.—Calcd. for C$_8$H$_6$N$_6$: C, 54.54; H, 3.05; N, 42.41. Found: C, 54.74; H, 3.02; N, 43.04.

EXAMPLE 18

2-amino-3,5-dicyano-6-dimethylaminopyrazine

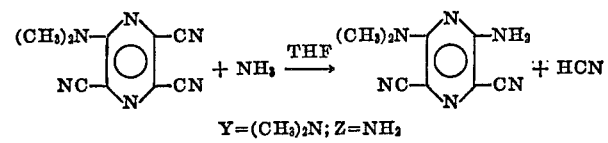

Y=(CH$_3$)$_2$N; Z=NH$_2$

A slow stream of ammonia was passed for 1 hour over a well-stirred solution of 2.30 g. (11.6 mmol) of 2-dimethylamino-3,5,6-tricyanopyrazine (see Example 17) in 50 ml. of dry tetrahydrofuran at ambient temperature. After an additional hour the reaction mixture was evaporated to dryness on a rotatory evaporator giving 1.94 g. (89% crude yield) of an off-white solid whose infrared spectrum is the same as that of the analytical sample obtained by recrystallization from benzene, M.P. 202.0–203.0.

IR (Nujol): 2.95μ; 3.05μ; 3.15μ; 4.5μ; 6.1μ; 6.45μ.

UV $\lambda_{max.}^{EtOH}$: 365 mμ (ε=15,100); 285 mμ (ε=19,600); 237 mμ (ε=30,300).

NMR (acetone-d$_6$): singlet, 3.38δ (6H); broad peak at ca. 7δ (2H).

Analysis.—Calcd. for C$_8$H$_8$N$_6$: C, 51.05; H, 4.28; N, 44.66. Found: C, 50.97; H, 4.22; N, 44.98.

EXAMPLE 19

2-amino-3,5-dicyano-6-(N-methylanilino)pyrazine

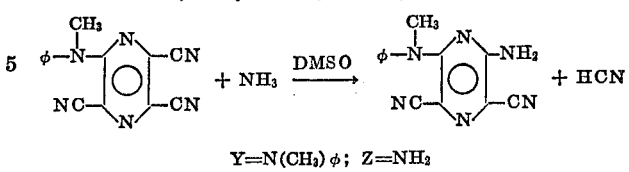

Y=N(CH$_3$)φ; Z=NH$_2$

To a stirred solution of 3.00 g. (11.5 mmol) of 2-(N-methylanilino)-3,5,6-tricyanopyrazine (Example 6) was added 1.5 ml. of 30% aqueous ammonium hydroxide in one portion. The solution warmed slightly and became dark. After 10 minutes the reaction mixture was poured into 200 ml. of water whereupon the dark color dissipated and a tan solid formed which was collected by filtration and washed with water. After drying there was 2.43 g. (84.4% crude yield) of material which was recrystallized from 85 ml. of chloroform with Darco treatment giving 2-amino-3,5-dicyano-6-(N-methylanilino)pyrazine as yellow microcrystals, M.P. 230.0–230.5°.

IR (Nujol): 2.90μ; 3.0μ; 4.5μ; 6.2μ; 6.48μ; 7.17μ; 7.88μ.

UV $\lambda_{max.}^{EtOH}$: 367 mμ (ε=17,800); 289 mμ (ε=14,100); 238 mμ (ε=28,200).

NMR (acetone-d$_6$): singlet, 7.50δ (5H); singlet, 3.48δ (3H); broad absorption centered at ca. 7δ (2H).

Analysis.—Calcd. for C$_{13}$H$_{10}$N$_6$: C, 62.39; H, 4.03; N, 33.58. Found: C, 62.00; H, 3.98; N, 33.93.

The following examples illustrate utility of the compounds of the invention.

EXAMPLE A

Fluorescing agents

All of the pyrazines prepared by this invention fluoresce. A test for fluorescence brighteners is:

Two milliliters of a dimethylformamide solution of 0.75% of the test compound is added to 125 ml. of a 0.4% detergent solution in distilled water. This bath is heated to 130° F. and a 5-g. swatch of fabric immersed therein for 25 minutes. The swatch is then removed, rinsed twice and air-dried.

The instant compounds were tested on a multifiber test fabric that contained the following fibers: nylon, Orlon®, Dacron®, cotton.

The 2-methoxy-3,5,6-tricyanopyrazine (Example 7) showed affinity for and brightening of nylon.

The product of Example 1 (2,6-diamino-3,5-dicyanopyrazine) showed affinity for Orlon®. The brightening action was definite.

EXAMPLE B

Curing of epoxy resins

A mixture composed of 16.9 parts of 2,6-diamino-3,5-dicyanopyrazine, 2.76 parts of Diuron® [N,N-(dimethyl)-N,-dichlorophenyl] urea, which is a curing agent for epoxy resins), and 100 parts of epoxy resin sold by Dow Chemical Co. as Dow QX-3599, was applied between cold-rolled steel sheets and cured by heating at 250° F. for 90 minutes. The resultant bond had a shear strength of 2700 p.s.i.

EXAMPLE C

Polymer formation

The 2,6-diamino- and 2,6-di(alkylamino)-3,5-dicyanopyrazines are useful in polymer formation. For example the equation below depicts the formation of a polymer comprising units of the structure shown.

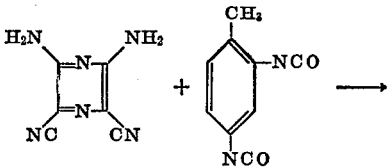

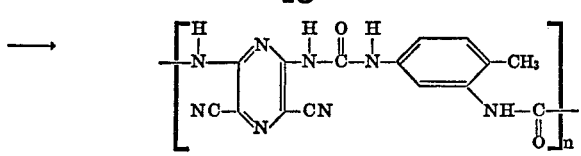

EXAMPLE D

Polyamide from 2,6-dipiperidino-3,5-dicyanopyrazine and toluene diisocyanate

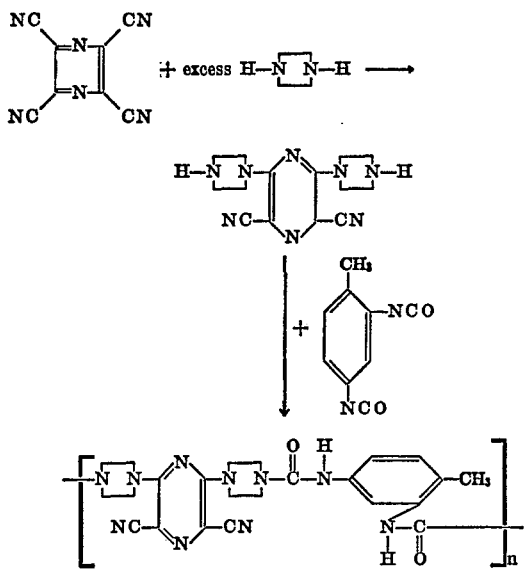

To a solution of 68.8 g. (0.8 mole) of piperazine in 950 ml. of tetrahydrofuran was added over 1.7 hours a solution of 36 g. (0.2 mole) of tetracyanopyrazine in 150 ml. of tetrahydrofuran. The solvent was removed under reduced pressure and the residue was triturated with water. The solid was filtered off and washed well to remove excess piperazine and then dried at 70° C. under vacuum. The light-yellow solid (57 g.) was stirred with 1 liter of boiling tetrahydrofuran and the insoluble material (10 g.) was removed by filtration. On cooling in ice, the filtrate deposited 24.4 g. of light yellow product, 2,6-dipiperidino-3,5-dicyanopyrazine, M.P. 158–159° C.

NMR(CDCl$_3$): 3.7–4.1$\delta$ (m, 2H, CH$\delta$); 2.8–3.2$\delta$ (m, 2H, CH$\delta$); 1.83$\delta$ (s, 1H, NH).

IR (KBr): 2.90$\mu$, 3.08$\mu$ (NH); 4.51$\mu$ (C≡N); 6.42$\mu$, 6.50$\mu$ (C=C, C=N).

UV $\lambda_{max}^{EtOH}$: 378 m$\mu$ ($\epsilon$=13,000); 300 m$\mu$ ($\epsilon$=19,500); 262 m$\mu$ ($\epsilon$=25,700); MS M+ m/e 298.1659, calcd. for C$_{14}$H$_{18}$N$_8$ M+ m/e 298.1654, m/e 243.

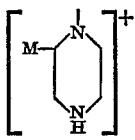

*Analysis.*—Calcd. for C$_{14}$H$_{18}$N$_8$: C, 56.36; H, 6.08; N, 37.57. Found: C, 56.55, 56.27; H, 6.02, 6.23; N, 37.88, 38.07.

To a slurry of 4.15 g. (0.0139 mole) of 2,6-dipiperidino-3,5-dicyanopyrazine in 15 ml. of dimethylformamide was added 2.43 g. (0.0139 mole) of toluenediisocyanate in 10 ml. of dimethylformamide, followed by a 15-ml. dimethylformamide wash. Stirring was continued for 4 hours, and the polymer was then precipitated into methanol to give 6.10 g. (93%) of light yellow polymer, $\eta_{inh}$ 0.38, 0.1% in dimethylformamide, 25° C. A tough, self-supporting film was cast and dried at 80° C. overnight under vacuum. Differential scanning calorimetry showed a possible glass transition temperature at 46° C. and an exotherm at 225–280° C. Differential thermal analysis from −40 to +150° C. showed no significant thermal event. The film was drawn 3× at 250° C. (stick temperature 280° C.) and the $T_B/E_BM_i$ of the undrawn and drawn film are 8500 p.s.i./5.6%/246,500 p.s.i. and 9900/6.3%/274,800.

*Analysis.*—Calcd. for C$_{23}$H$_{24}$N$_{10}$O$_2$: C, 58.46; H, 5.12; N, 29.65. Found: C, 57.87, 57.96; H, 5.25, 5.30; N, 29.11, 29.54.

EXAMPLE E

Polyamide from terephthaloyl chloride and 2,6-di(1-piperidyl)-3,5-dicyanopyrazine

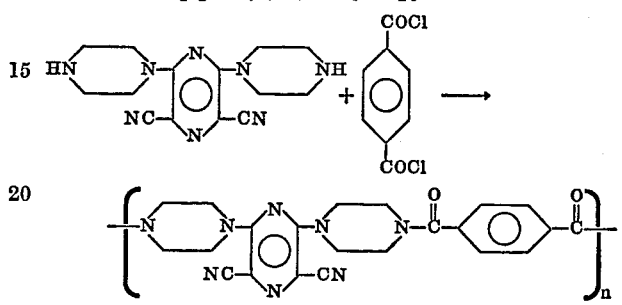

A solution of 5.97 g. (0.02 mol) of diamine in 70 ml. of dry dimethylacetamide was cooled to −78° C. and 4.06 g. (0.02 mol) of terephthaloyl chloride was added all at once. The Dry-Ice bath was replaced with an ice-water bath, and stirring was continued for 45 minutes. The bath was removed, and stirring was continued for another 2.5 hours. The polymer was precipitated by pouring into methanol, washed with water, aqueous bicarbonate solution, water, and methanol and dried. A total of 7.85 g. of very light yellow polymer was obtained, $\eta_{inh}$ 0.43, 0.1% in hexafluoroisopropanol, 25° C. The polymer was insoluble in amides, but was soluble in acidic solvents, hexafluoroisopropanol, and formic acid. Only brittle films could be cast from hexafluoroisopropanol. Differential thermal analysis showed a possible T$_g$ at 273° C., exotherm at 337° C. Differential scanning calorimetry showed an exotherm at 225° C., but no T$_g$.

*Analysis.*—Calcd. for C$_{22}$H$_{20}$N$_8$O$_2$: C, 61.68; H, 4.71; N, 26.17. Found: C, 61.44; H, 4.69; N, 25.81.

The embodiments of the invention in which an exclusive property or privilege is claimed are defined as follows:

1. A compound having the formula

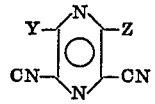

wherein Y and Z, alike or different, are selected from —NH$_2$—, —NHR$^1$, —N(R$^1$)$_2$, and —NR$^1$R$^2$; and wherein each R$^1$, alike or different, is alkyl or alkenyl of up to 4 carbon atoms; R$^2$ is phenyl.

2. The compound of claim 1 wherein Y and Z are each —NH$_2$; 2,6-diamino-3,5-dicyanopyrazine.

3. The compound of claim 1 wherein Y and Z are each —N(CH$_3$)$_2$; 2,6 - (bis(dimethylamino)-3,5-dicyanopyrazine.

4. The compound of claim 1 wherein Y=Z=NHCH$_3$; 2,6-bis(N-methylamino)-3,5-dicyanopyrazine.

5. The compound of claim 1 wherein

Y=Z=NHCH$_2$CH=CH$_2$;

2,6-di(allylamino)-3,5-dicyanopyrazine.

6. A method of preparing dicyanopyrazines comprising the step of reacting 1 mole of

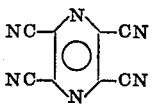

with at least 2 mols of $HZ^1$ at a temperature of $-60$ to $150°$ C. for 0.5 to 24 hours to produce

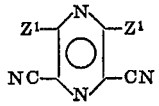

wherein $Z^1$ is selected from $-NH_2$, $-NHR^1$, and $-N((R^1)_2$, in which $R^1$ is alkyl or alkenyl of up to 4 carbon atoms.

References Cited

UNITED STATES PATENTS

| | | | |
|---|---|---|---|
| 3,763,161 | 10/1973 | Hartter | 260—250 R |
| 2,722,540 | 11/1955 | Carter | 260—465.5 |
| 3,101,344 | 8/1963 | Vest | 260—327 |

FOREIGN PATENTS

| | | | |
|---|---|---|---|
| 471,418 | 8/1937 | Great Britain | 260—250 R |
| 892,234 | 3/1962 | Great Britain | 260—250 R |

OTHER REFERENCES

Begland et al.: "Hydrogen Cyanide Chemistry I. Diiminosuccinonitrile," J.A.C.S., 93:19, Sept. 22, 1971.

DONALD G. DAUS, Primary Examiner

R. D. McCLOUD, Assistant Examiner

U.S. Cl. X.R.

8—1 D, 1 W, 21 R, 77, 92; 117—33.5 T; 252—301.2 W; 260—246 B, 247.5, 268 BI, 268 H, 268 PL, 465.5 R, 566, 858